United States Patent
Yang et al.

(10) Patent No.: US 12,300,793 B1
(45) Date of Patent: May 13, 2025

(54) 1.5V LITHIUM BATTERY AND MANUFACTURING METHOD THEREOF

(71) Applicant: Hamedata Technology Co., Limited, Guangdong (CN)

(72) Inventors: Changjun Yang, Guangdong (CN); Pengfei Xiao, Guangdong (CN); Jian Zhao, Guangdong (CN); Wei Zhou, Guangdong (CN); Qiang Hou, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 18/783,578

(22) Filed: Jul. 25, 2024

Related U.S. Application Data

(63) Continuation of application No. PCT/CN2024/096456, filed on May 30, 2024.

(30) Foreign Application Priority Data

| Feb. 2, 2024 | (CN) | 202410147169.3 |
| Feb. 2, 2024 | (CN) | 202420272216.2 |
| Feb. 28, 2024 | (CN) | 202410218290.0 |

(51) Int. Cl.
| *H01M 10/0587* | (2010.01) |
| *H01M 10/052* | (2010.01) |
| *H01M 10/42* | (2006.01) |
| *H01M 50/107* | (2021.01) |
| *H01M 50/119* | (2021.01) |
| *H01M 50/184* | (2021.01) |
| *H01M 50/186* | (2021.01) |
| *H01M 50/536* | (2021.01) |
| *H01M 50/545* | (2021.01) |
| *H01M 50/56* | (2021.01) |
| *H01M 50/566* | (2021.01) |

(52) U.S. Cl.
CPC ..... *H01M 10/4257* (2013.01); *H01M 10/052* (2013.01); *H01M 10/0587* (2013.01); *H01M 50/107* (2021.01); *H01M 50/119* (2021.01); *H01M 50/184* (2021.01); *H01M 50/186* (2021.01); *H01M 50/536* (2021.01); *H01M 50/545* (2021.01); *H01M 50/56* (2021.01); *H01M 50/566* (2021.01)

(58) Field of Classification Search
CPC .......... H01M 10/4257; H01M 50/107; H01M 50/186; H01M 50/545; H01M 50/184; H01M 50/119; H01M 50/56; H01M 50/536; H01M 50/566; H01M 10/052; H01M 10/0587
USPC .......................................................... 429/7
See application file for complete search history.

(56) References Cited

U.S. PATENT DOCUMENTS

| 6,524,739 | B1 | 2/2003 | Iwaizono et al. | |
| 2016/0204485 | A1 | 7/2016 | Moon et al. | |
| 2018/0069273 | A1 | 3/2018 | Zhang et al. | |
| 2021/0408809 | A1 | 12/2021 | Liu et al. | |
| 2022/0252231 | A1* | 8/2022 | Wang | H01M 50/152 |
| 2023/0268594 | A1 | 8/2023 | Asano et al. | |
| 2024/0313271 | A1* | 9/2024 | Zeng | H01M 50/107 |

FOREIGN PATENT DOCUMENTS

| CN | 101604764 A | 12/2009 |
| CN | 102299392 A | 12/2011 |
| CN | 202142621 U | 2/2012 |
| CN | 203787480 U | 8/2014 |
| CN | 204966611 U | 1/2016 |
| CN | 205985094 U | 2/2017 |
| CN | 106486693 A | 3/2017 |
| CN | 206180010 U | 5/2017 |
| CN | 107968161 A | 4/2018 |
| CN | 110289442 A | 9/2019 |
| CN | 210224208 U | 3/2020 |
| CN | 111816934 A | 10/2020 |
| CN | 211952620 U | 11/2020 |
| CN | 112201839 A | 1/2021 |
| CN | 112201874 A | 1/2021 |
| CN | 214477625 U | 10/2021 |

(Continued)

OTHER PUBLICATIONS

English language machine translation of, "1.5V Constant Voltage Lithium Ion Battery", by Lyu Xiao et al. in CN 204966611—Jan. 13, 2016 (Year: 2016).*
International Search Report received in International Patent Application No. PCT/CN2024/096421, mailed Oct. 9, 2024, 8 pages.
International Search Report received in corresponding International Patent Application No. PCT/CN2024/096456, mailed Oct. 9, 2024, 6 pages.
Non-Final Office Action received in U.S. Appl. No. 18/783,521, dated Sep. 13, 2024, 22 pages.

(Continued)

*Primary Examiner* — Jonathan G Jelsma
*Assistant Examiner* — Omar M Kekia
(74) *Attorney, Agent, or Firm* — Cooper Legal Group, LLC

(57) ABSTRACT

The present application relates to a 1.5V lithium battery and a manufacturing method thereof; the 1.5V lithium battery includes a circuit assembly, a plastic middle frame, a wound battery core assembly, a metal housing and an insulating sheath, wherein the circuit assembly, the plastic middle frame and the wound battery core assembly are sequentially arranged in the metal housing from top to bottom; a rolling groove is inwardly provided in an upper portion of the metal housing, a spun edge is inwardly provided at a top of the metal housing, the wound battery core assembly is limited at a bottom of the metal housing by the rolling groove, the plastic middle frame is limited between the rolling groove and the spun edge to realize sealing between the plastic middle frame and the metal housing, and the circuit assembly is arranged on the plastic middle frame.

5 Claims, 22 Drawing Sheets

(56) References Cited

FOREIGN PATENT DOCUMENTS

| | | |
|---|---|---|
| CN | 113659256 A | 11/2021 |
| CN | 216413143 U | 4/2022 |
| CN | 116799335 A | 9/2023 |
| CN | 117013204 A | 11/2023 |
| CN | 220233280 U | 12/2023 |
| CN | 117673498 A | 3/2024 |
| CN | 117855628 A | 4/2024 |
| JP | 59067856 U | 5/1984 |
| JP | 2004265722 A | 9/2004 |
| JP | 2007194129 A | 8/2007 |
| JP | 2012146766 A | 8/2012 |
| JP | 2018056075 A | 4/2018 |
| JP | 2018160439 A | 10/2018 |
| WO | 2022030231 A1 | 2/2022 |
| WO | 2023085030 A1 | 5/2023 |

OTHER PUBLICATIONS

Office Action received in Japanese Patent Application No. 2024-106791, dated Sep. 10, 2024, 10 pages.

Office Action received in Japanese Patent Application No. 2024-113515, dated Oct. 22, 2024, 10 pages.

International Search Report received in International Patent Application No. PCT/CN2024/096517, mailed Sep. 24, 2024, 10 pages.

Final Office Action received in U.S. Appl. No. 18/783,521, dated Nov. 20, 2024, 23 pages.

"Periphery", in New Oxford American Dictionary, 3 ed., Edited by: Angus Stevenson and Christine A. Lindberg, Oxford University Press, 2010, URL: https://www.oxfordreference.com/display/10.1093/acref/9780195392883.001.0001/m_en_us1277001.

"On", in New Oxford American Dictionary, 3 ed., Edited by: Angus Stevenson and Christine A. Lindberg, Oxford University Press, 2010, URL: https://www.oxfordreference.com/display/10.1093/acref/9780195392883.001.0001/m_en_us1273365.

"Side", in New Oxford American Dictionary, 3 ed., Edited by: Angus Stevenson and Christine A. Lindberg, Oxford University Press, 2010, URL: https://www.oxfordreference.com/display/10.1093/acref/9780195392883.001.0001/m_en_us1290484.

"Central", in New Oxford American Dictionary, 3 ed., Edited by: Angus Stevenson and Christine A. Lindberg, Oxford University Press, 2010, URL: https://www.oxfordreference.com/display/10.1093/acref/9780195392883.001.0001/m_en_us1231691.

Non-Final Office Action received in corresponding U.S. Appl. No. 18/783,521, dated Mar. 5, 2025, 16 pages.

\* cited by examiner

1.5V LITHIUM BATTERY AND MANUFACTURING METHOD THEREOF

CROSS-REFERENCE TO RELATED APPLICATIONS

The present application is a continuation of PCT application serial no. PCT/CN2024/096456, filed on May 30, 2024, which claims the priority benefits of China patent application No. 202410147169.3, filed on Feb. 2, 2024, China patent application No. 202410218290.0, filed on Feb. 28, 2024, and China patent application No. 202420272216.2, filed on Feb. 2, 2024. The entireties of PCT application serial no. PCT/CN2024/096456, China patent application No. 202410147169.3, China patent application No. 202410218290.0, and China patent application No. 202420272216.2 are hereby incorporated by reference herein and made a part of this specification.

FIELD OF THE INVENTION

The present application relates to the field of lithium battery technologies, and in particular, to a 1.5V lithium battery and a manufacturing method thereof.

BACKGROUND OF THE INVENTION

Chinese Patent Application No. CN203787480U titled "Variable-Voltage Cylindrical Battery Apparatus" discloses a low-voltage lithium battery, which changes a high voltage (3.0-4.2V) of a lithium battery into a low voltage of 1.5V through a voltage drop circuit board to replace a common AA battery and AAA battery. Chinese Patent Application No. CN204966611U titled "1.5V Constant-Voltage Lithium Ion Battery" discloses a voltage drop circuit capable of constantly outputting a low voltage of 1.5V. In the above prior art, a cylindrical battery core is adopted, and generally speaking, the battery core can be a soft-package battery core or a hard-shell battery core, and a metal housing is added outside the battery core. However, although this achieves a simple assembling process, it involves in a high cost.

SUMMARY

In order to solve the technical problem of a high cost of a 1.5V lithium battery, the present invention provides a 1.5V lithium battery and a manufacturing method thereof.

In an aspect, the technical solution provided by the present application is as follows: a 1.5V lithium battery includes a circuit assembly, a plastic middle frame, a wound battery core assembly, a metal housing and an insulating sheath, wherein the insulating sheath covers the metal housing, and the circuit assembly, the plastic middle frame and the wound battery core assembly are sequentially arranged in the metal housing from top to bottom; a rolling groove is inwardly provided in an upper portion of the metal housing, a spun edge is inwardly provided at a top of the metal housing, the wound battery core assembly is limited at a bottom of the metal housing by the rolling groove, the plastic middle frame is limited between the rolling groove and the spun edge, sealing between the plastic middle frame and the metal housing is realized, and the circuit assembly is arranged on the plastic middle frame.

In the present application, the wound battery core assembly is directly placed in the metal housing, and compared with a soft-package lithium battery core or a hard-shell lithium battery core adopted in the prior art, a wrapping housing is omitted, and a cost is lower. By providing the rolling groove, the wound battery core assembly is fixed, the rolling groove and the spun edge at an upper end jointly and tightly press and seal the plastic middle frame, and an electrolyte cannot leak.

Preferably, the sealing between the plastic middle frame and the metal housing is realized through close fit; or a lower end of the plastic middle frame is sleeved with a sealing ring, and the sealing ring is tightly pressed between the plastic middle frame and the rolling groove, thereby realizing the sealing between the plastic middle frame and the metal housing.

Preferably, the wound battery core assembly includes a wound battery core, a positive tab, a negative tab, an upper isolating piece and a lower isolating piece, the positive tab penetrates out of a central hole of the upper isolating piece to be electrically connected to the circuit assembly, the negative tab is wound from a side surface to a bottom surface of the wound battery core, and an end portion of the negative tab is welded to a bottom wall of the metal housing.

Preferably, the circuit assembly includes a PCB, a low-voltage positive cap, a negative elastic piece and a high-voltage positive cap, a front surface of the PCB is provided with a low-voltage positive copper ring and a negative copper ring, a back surface of the PCB is provided with a high-voltage positive copper ring, the low-voltage positive cap is welded on the positive copper ring by a patch, the negative elastic piece includes a base ring and fins uniformly distributed on a periphery of the base ring, a back surface of the base ring is welded on the negative copper ring by a patch, and the fins are elastically pressed on the spun edge of the metal housing; the high-voltage positive cap is welded on the high-voltage positive copper ring by a patch and used as a high-voltage positive input end, the high-voltage positive cap is connected with the positive tab in a welded mode, the low-voltage positive cap is used as a low-voltage output positive electrode of the lithium battery, and the metal housing is used as a common negative electrode.

Preferably, an inner wall of the plastic middle frame is provided with a flange edge for supporting the PCB, and a pouring sealant is further arranged between the high-voltage positive cap and the plastic middle frame to form sealing, so as to isolate the electrolyte; electronic elements on the PCB are centrally arranged in the low-voltage positive cap and the high-voltage positive cap; and a positive and negative electrode isolating piece is further pasted above the spun edge, and part of an upper surface of the positive and negative electrode isolating piece is further wrapped by the insulating sheath.

Preferably, the circuit assembly includes a PCB, a low-voltage positive cap, a charging interface, a negative elastic piece and a positive adapter piece, the low-voltage positive cap is welded on an upper surface of the PCB by a patch, the charging interface and the positive adapter piece are arranged on a lower surface of the PCB, the upper surface of the PCB is provided with a common negative pad, the negative elastic piece includes a substrate and a plurality of fins arranged at an outer edge of the substrate, a back surface of the substrate is welded on the common negative pad by a patch, the fins are elastically pressed on the spun edge of the metal housing, the positive tab of the wound battery core assembly is fixedly welded to the positive adapter piece, the negative tab is fixedly welded to a bottom end of the metal housing, the PCB is clamped in the plastic middle frame, the PCB is further provided with a charging indicator lamp, same positions of the insulating sheath and the metal housing are provided with a charging hole and a light transmission hole, and the plastic middle frame is made of a transparent material.

Preferably, a first through hole is formed in a middle of a bottom wall of the plastic middle frame, the positive adapter piece downwards penetrates through the first through hole and is bent to be connected with the positive tab by spot welding, and a pouring sealant is arranged at the first through hole to form sealing, so as to isolate the electrolyte; a positive and negative electrode isolating piece is further pasted above the spun edge, part of an outer side of the positive and negative electrode isolating piece is wrapped by the insulating sheath, and a PCB isolating piece is further arranged between the PCB and the spun edge to prevent a short circuit between the electronic elements or welding spots on the PCB and the spun edge; the plastic middle frame is internally provided with an accommodating cavity of the PCB, an inner wall of an upper end of the plastic middle frame is discretely provided with a plurality of first buckles, and the PCB is limited in the accommodating cavity by the first buckles; a thin wall pressure release hole is further formed in the bottom wall of the plastic middle frame, and the thin wall pressure release hole is located below the charging interface.

Preferably, the circuit assembly includes a PCB, a positive contact spring, a positive adapter piece, a negative elastic piece and a low-voltage positive cap, the plastic middle frame includes an upper plastic housing and a plastic lower housing which are buckled to each other, the PCB is vertically arranged between the upper plastic housing and the plastic lower housing, the positive contact spring is arranged at an upper end of the PCB, the positive adapter piece is arranged at a lower end of the PCB, a charging interface and the negative elastic piece are arranged in a middle of the PCB, the low-voltage positive cap is arranged on the upper plastic housing, the positive contact spring upwardly penetrates through the upper plastic housing to be in elastic contact with an inner wall of the low-voltage positive cap, the negative elastic piece is in elastic contact with an inner wall of the metal housing, the positive tab of the wound battery core assembly is welded on the positive adapter piece, a positive and negative electrode isolating piece is further arranged between the spun edge and the low-voltage positive cap, a charging indicator lamp is further arranged on the PCB, same positions of the insulating sheath and the metal housing are provided with a charging hole and a light transmission hole, and the upper plastic housing and the plastic lower housing are both made of a transparent material.

Preferably, a slot is formed in a side surface of the upper plastic housing, a buckling hole is formed in a side wall of the slot, an inserting piece is arranged on the plastic lower housing, a second buckle is arranged on an inner side of the inserting piece, and after the upper plastic housing and the plastic lower housing are in butt connection, the inserting piece is inserted into the slot, and the second buckle is embedded into the buckling hole; a side wall of the upper plastic housing is further provided with a first avoidance hole and a second avoidance hole which are configured to expose the charging interface and the negative elastic piece respectively.

In another aspect, the present application provides a manufacturing method of the above-mentioned 1.5V lithium battery, including:

S1: placing the wound battery core assembly into the metal housing, tightly pressing the wound battery core assembly at the bottom of the metal housing, and performing spot welding on the bottom of the metal housing to weld the negative tab on the metal housing;

S2: spinning forming the rolling groove at the upper portion of the metal housing in a spinning mode; limiting the wound battery core assembly within the metal housing;

S3: filling the wound battery core assembly with the electrolyte;

S4: placing the circuit assembly into the plastic middle frame;

S5: welding the positive tab of the wound battery core assembly onto the circuit assembly;

S6: placing the circuit assembly and the plastic middle frame into the metal housing;

S7: spinning forming the spun edge at the upper end of the metal housing, and limiting the circuit assembly and the plastic middle frame in the metal housing;

S8: pasting the positive and negative electrode isolating piece above the spun edge; and S9: wrapping the metal housing by the insulating sheath.

In summary, the present application can achieve at least one of the following beneficial effects.

1. In the present application, the wound battery core assembly is directly placed in the metal housing to lower the cost; and the metal housing is provided with the rolling groove and the spun edge, such that the wound battery core assembly and the plastic middle frame can be fixed firmly, achieving pressing sealing while preventing the electrolyte from leakage;

2. The PCB in the circuit assembly in the present application is also provided with necessary circuits, such as a voltage drop circuit, a voltage stabilizing circuit, a charging circuit, an over-discharge protection circuit, or the like, the low-voltage positive cap is used as a positive electrode of the battery, and the metal housing is used as a negative electrode of the battery, so that a low voltage can be stably output;

3. In the present application, the low-voltage positive cap and the high-voltage positive cap are provided, the positive copper ring, the negative copper ring and the high-voltage input copper ring are arranged on the PCB, thereby eliminating the need of conductive cables while increasing stability of an electrical performance.

DETAILED DESCRIPTION

Figure 1:
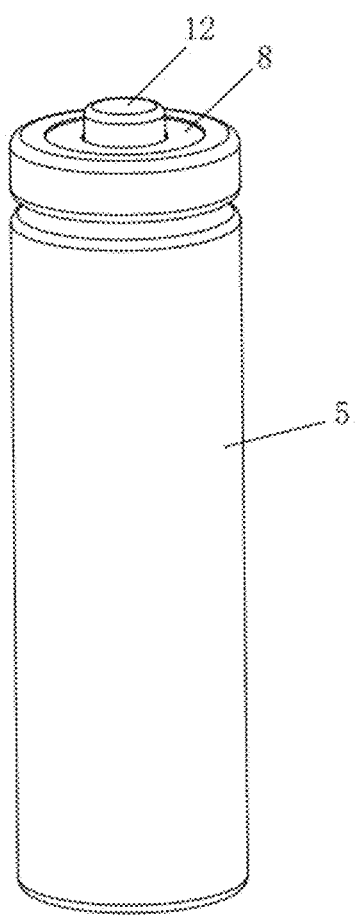
FIG. 1 is a perspective view of a 1.5V lithium battery according to a first embodiment of the present application.
Figure 2:
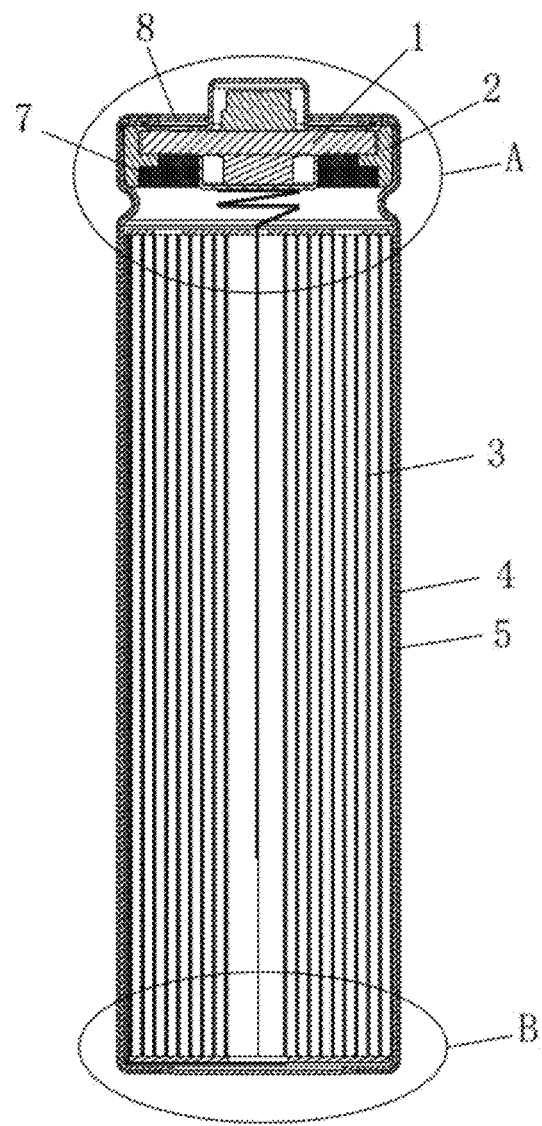
FIG. 2 is a schematic diagram of a half-section structure of the 1.5V lithium battery according to the first embodiment of the present application.

The present application will be further described below in details with reference to FIGS. 1 to 37.

First Embodiment

Referring to FIGS. 1 to 22, an embodiment of the present application discloses a 1.5V lithium battery, including a circuit assembly 1, a plastic middle frame 2, a wound battery core assembly 3, a metal housing 4 and an insulating sheath 5. The insulating sheath 5 covers the metal housing 4, and the circuit assembly 1, the plastic middle frame 2 and the wound battery core assembly 3 are sequentially arranged in the metal housing 4 from top to bottom. A rolling groove 41 is inwardly provided in an upper portion of the metal housing 4, a spun edge 42 is inwardly provided at a top of the metal housing, and the wound battery core assembly 3 is limited at a bottom of the metal housing 4 by the rolling groove 41. The plastic middle frame 2 is limited between the rolling groove 41 and the spun edge 42, and sealing between the plastic middle frame and the metal housing 4 is realized. The circuit assembly 1 is arranged on the plastic middle frame 2. In the present embodiment, sealing between the plastic middle frame 2 and the metal housing 4 is realized by close fit.

Figure 3:
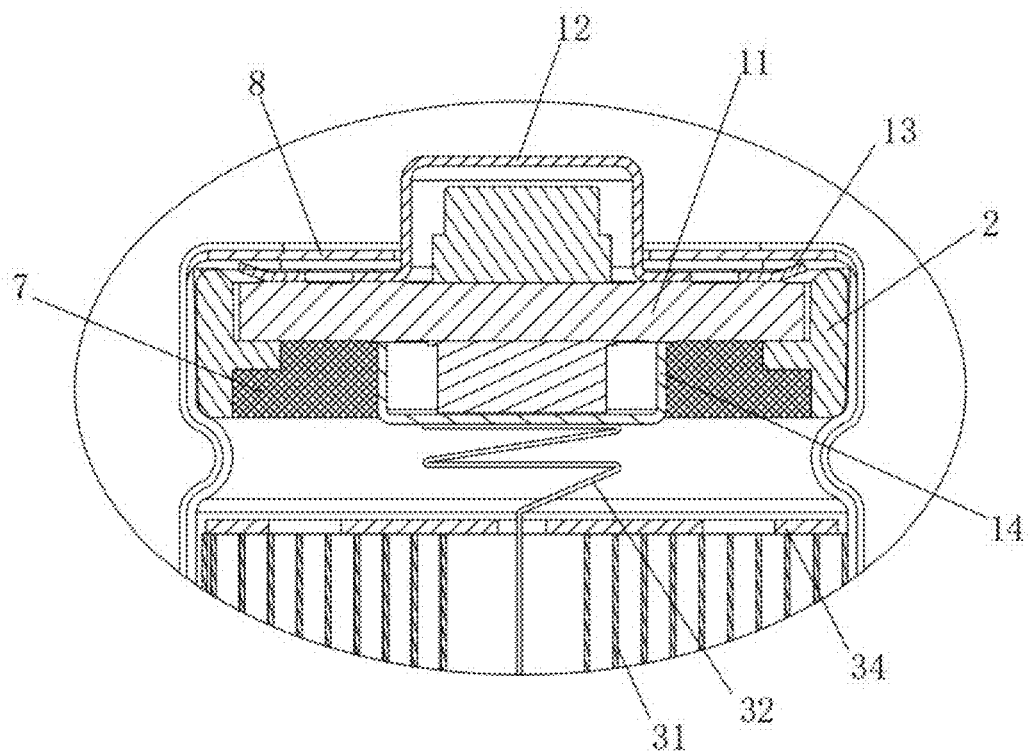
FIG. 3 is an enlarged view of Portion A in FIG. 2.
Figure 4:
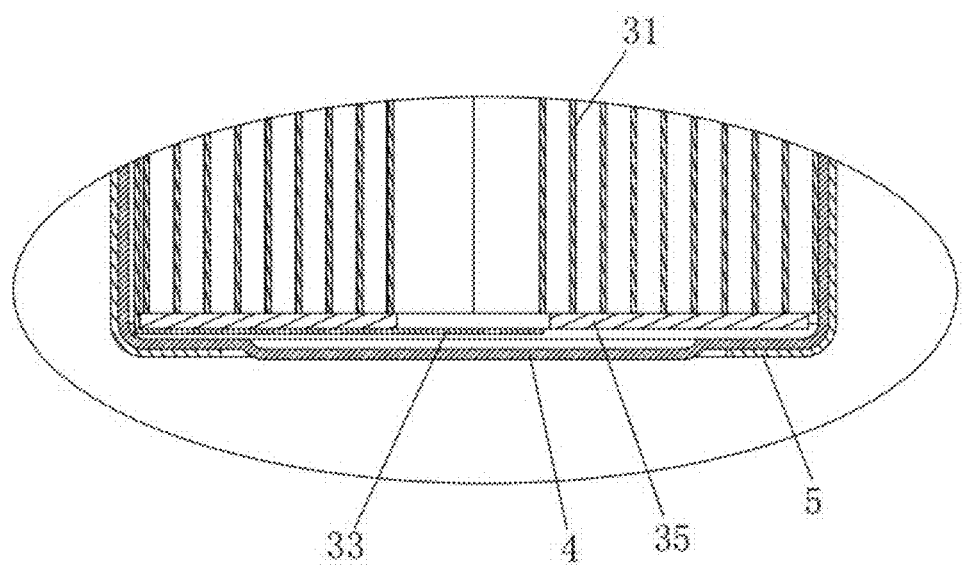
FIG. 4 is an enlarged view of Portion B in FIG. 2.
Figure 7:
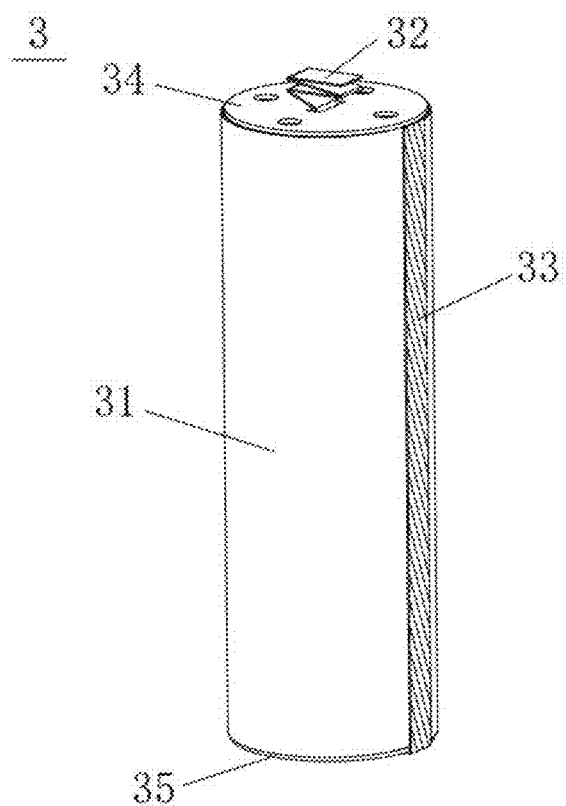
FIG. 7 is a perspective view of a wound battery core assembly in the first embodiment of the present application.

Referring to FIGS. 3, 4 and 7, the wound battery core assembly 3 includes a wound battery core 31, a positive tab 32, a negative tab 33, an upper isolating piece 34 and a lower isolating piece 35. The positive tab 32 penetrates out of a central hole of the upper isolating piece 34 to be electrically connected to the circuit assembly 1, the negative tab 33 is wound from a side surface to a bottom surface of the wound battery core 31, and an end portion of the negative tab is welded to a bottom wall of the metal housing 4. The wound battery core assembly 3 may be a ternary wound battery core assembly or an iron phosphate wound battery core assembly commonly available in the market, and certainly, other types of wound battery core assemblies may be selected, a voltage range is between 3.0V and 4.2V, and after a voltage drop by the PCB 11, a constant voltage of 1.5V is output. Various functional circuits on the PCB 11 are already known in the prior art, not substantially improved in the present application, and thus not described here. The insulating sheath 5 in the present application is preferably made of PVC, has the characteristics of thermal shrinkage, and can tightly wrap the metal housing 4 by blowing hot air.

Figure 5:
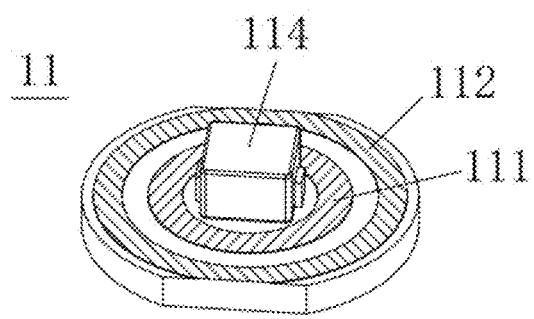
FIG. 5 is a front perspective view of a PCB in the first embodiment of the present application.
Figure 6:
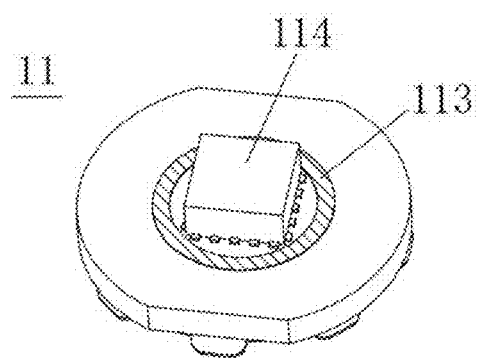
FIG. 6 is a back perspective view of the PCB in the first embodiment of the present application.
Figure 8:
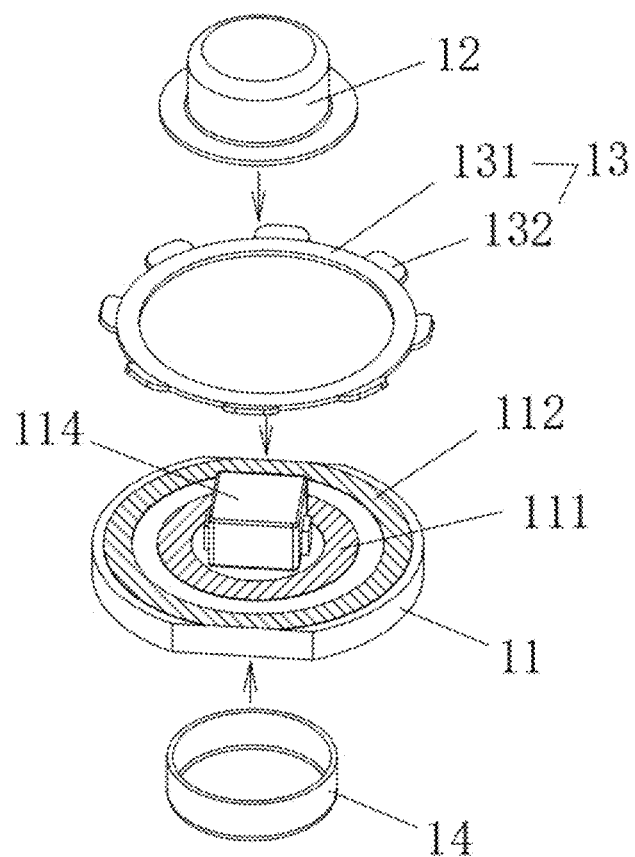
FIG. 8 is a schematic diagram of an assembly action of a circuit assembly in the first embodiment of the present application.
Figure 9:
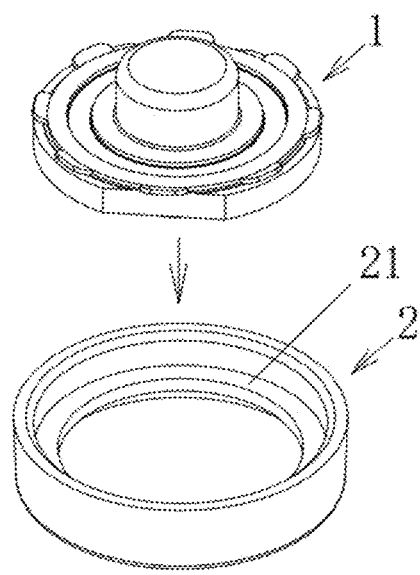
FIG. 9 is a schematic diagram of an assembly action of the circuit assembly and a plastic middle frame in the first embodiment of the present application.
Figure 10:
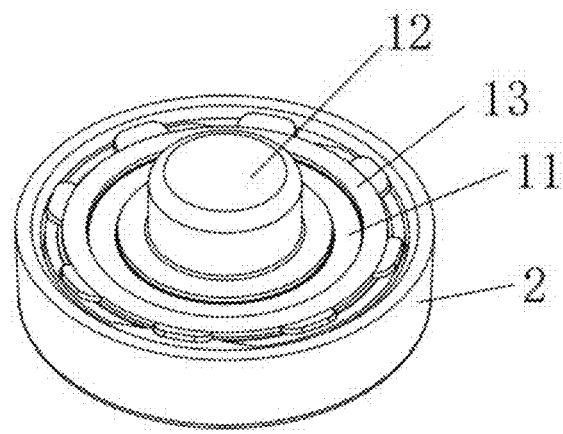
FIG. 10 is a front perspective view of the assembled circuit assembly and plastic middle frame in the first embodiment of the present application.
Figure 11:
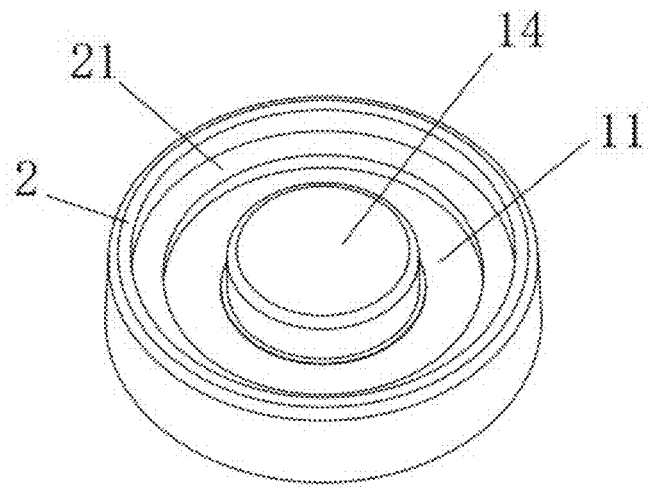
FIG. 11 is a back perspective view of the assembled circuit assembly and plastic middle frame in the first embodiment of the present application.
Figure 12:
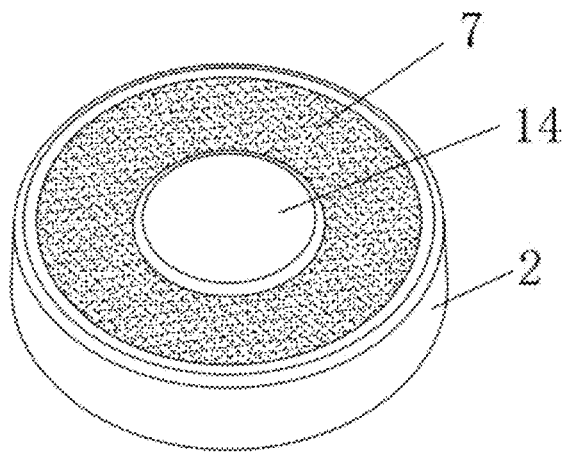
FIG. 12 is a schematic diagram after adhesive dispensing between the circuit assembly and the plastic middle frame in the first embodiment of the present application.

Referring to FIGS. 5, 6 and 8, the circuit assembly 1 includes a PCB 11, a low-voltage positive cap 12, a negative elastic piece 13 and a high-voltage positive cap 14. A front surface of the PCB 11 is provided with a low-voltage positive copper ring 111 and a negative copper ring 112, and a back surface of the PCB is provided with a high-voltage positive copper ring 113. The low-voltage positive cap 12 is welded on the positive copper ring by a patch, the negative elastic piece 13 includes a base ring 131 and fins 132 uniformly distributed on a periphery of the base ring 131, a back surface of the base ring 131 is welded on the negative copper ring 112 by a patch, and the fins 132 are elastically pressed on the spun edge 42 of the metal housing 4. The high-voltage positive cap 14 is welded on the high-voltage positive copper ring 113 by a patch and used as a high-voltage positive input end. The high-voltage positive cap 14 is connected with the positive tab 32 in a welded mode, the low-voltage positive cap 12 is used as a low-voltage output positive electrode of the lithium battery, and the metal housing 4 is used as a common negative electrode.

The PCB 11 in the circuit assembly 1 in the present embodiment is also provided with necessary circuits, such as a voltage drop circuit, a voltage stabilizing circuit, a charging circuit, an over-discharge protection circuit, or the like. The PCB 11 is characterized in that the front surface is provided with the low-voltage positive copper ring 111 and the negative copper ring 112, the back surface is provided with the high-voltage positive copper ring 113, the low-voltage positive copper ring 111 is used as the low-voltage output positive electrode, the high-voltage positive copper ring 113 is used as a high-voltage input positive electrode, the negative copper ring 112 is used as the common negative electrode, and by electrically connecting the three copper rings with an external conductive component, high-voltage input and low-voltage output functions are achieved, the low voltage of 1.5V can be output stably, a same-port charge and discharge function is achieved, conductive cables are eliminated, stability of an electrical performance is higher, an internal connection structure of the lithium battery is simplified, occurrence of failure is reduced, and safety is higher.

The fins 132 are elastically pressed on the spun edge 42 of the metal housing 4, and the elastic pressing can avoid the situation that pressing of the metal housing 4 and the negative copper ring 112 on the PCB 11 is not tight, or the negative copper ring 112 is crushed.

Referring to FIG. 3, an inner wall of the plastic middle frame 2 is provided with a flange edge 21 for supporting the PCB 11. A pouring sealant 7 is further arranged between the high-voltage positive cap 14 and the plastic middle frame 2 to form sealing, so as to isolate an electrolyte. Electronic elements 114 on the PCB 11 are centrally arranged in the low-voltage positive cap 12 and the high-voltage positive cap 14. A positive and negative electrode isolating piece 8 is further pasted above the spun edge 42, and part of an upper surface of the positive and negative electrode isolating piece 8 is further wrapped by the insulating sheath 5.

The pouring sealant 7 can fill a gap between the high-voltage positive cap 14 and the plastic middle frame 2 to achieve a good sealing effect, so as to isolate the electrolyte and avoid that the electrolyte contacts the PCB 11 to cause corrosion to result in premature failure of the PCB 11. By controlling a thickness and a section shape of the pouring sealant 7, the pouring sealant 7 can have certain strength. When failure occurs in the wound battery core assembly 3, a temperature rises, an air pressure is increased, and when the air pressure reaches a certain threshold, the pouring sealant 7 can be broken to release the pressure, so as to avoid an explosion of the lithium battery due to overpressure.

The low-voltage positive cap 12 and the high-voltage positive cap 14 are both welded on the PCB 11 by patches, such that firstly, connection strength is good, and fixation is reliable; and secondly, a junction has a large sectional area and a small resistance, and a conductive performance is good. The electronic elements 114 on the PCB 11 are preferably and centrally arranged in the low-voltage positive cap 12 and the high-voltage positive cap 14, such that, firstly, the electronic elements 114 are arranged reasonably, and inner spaces of the low-voltage positive cap 12 and the high-voltage positive cap 14 are fully utilized; secondly, the low-voltage positive cap 12 and the high-voltage positive cap 14 have good strength and can have a protection effect, and the electronic elements 114 are not in contact with the outside and cannot be damaged; thirdly, a sealing effect is achieved, water and dust are prevented, and service life of the PCB 11 is prolonged. In the present application, the electronic element 114 in the high-voltage positive cap 14 is a three-in-one voltage drop chip, which belongs to the prior art and has the advantages of a high integration level and a small volume, and the PCB 11 is easier to design; the electronic elements 114 inside the low-voltage positive cap 12 include an inductor, a capacitor, a resistor, or the like. In addition, since the low-voltage positive cap 12 is exposed and required to contact the outside, the low-voltage positive cap is prone to be impacted and requires a fixed connection mode with higher strength, and thus, particularly, a flange edge 21 is arranged on the low-voltage positive cap 12, and the flange edge 21 has a certain width which is several times of a wall thickness of the low-voltage positive cap 12, and therefore, an area of contact with the low-voltage positive copper ring 111 is large, and fixation is firm and resistant to an impact. The high-voltage positive cap 14 is not exposed and not subjected to an external impact, and has a slightly low strength requirement, and therefore, the flange edge 21 can be avoided.

The positive and negative electrode isolating piece 8 can stop sundries, such as dust, from entering a position between the negative elastic piece 13 and the low-voltage positive cap 12, so as to avoid a short circuit therebetween, and part of an upper surface of the positive and negative electrode isolating piece 8 is further wrapped by the insulating sheath 5 to further fix the positive and negative electrode isolating piece 8.

A circuit has the specific connection principle that the positive tab 32 of the wound battery core assembly 3 is connected to the PCB 11 through the high-voltage positive cap 14 and the high-voltage positive copper ring 113, the negative tab 33 of the wound battery core assembly 3 is connected to the PCB 11 through the metal housing 4, the negative elastic piece 13 and the negative copper ring 112, and after a voltage drop by the circuit on the PCB 11, the positive electrode of the lithium battery is output from the low-voltage positive copper ring 111 and the low-voltage positive cap 12, and the negative electrode of the lithium battery is output from the negative copper ring 112, the negative elastic piece 13 and the metal housing 4.

In the present application, the wound battery core assembly 3 is directly placed in the metal housing 4, and compared with a soft-package lithium battery core or a hard-shell lithium battery core adopted in the prior art, a wrapping housing is omitted, and a cost is lower. By providing the rolling groove 41, the wound battery core assembly 3 is fixed, the rolling groove 41 and the spun edge 42 at an upper end jointly and tightly press and seal the plastic middle frame 2, the electrolyte cannot leak, and integrated tight pressing sealing is realized.

Figure 13:
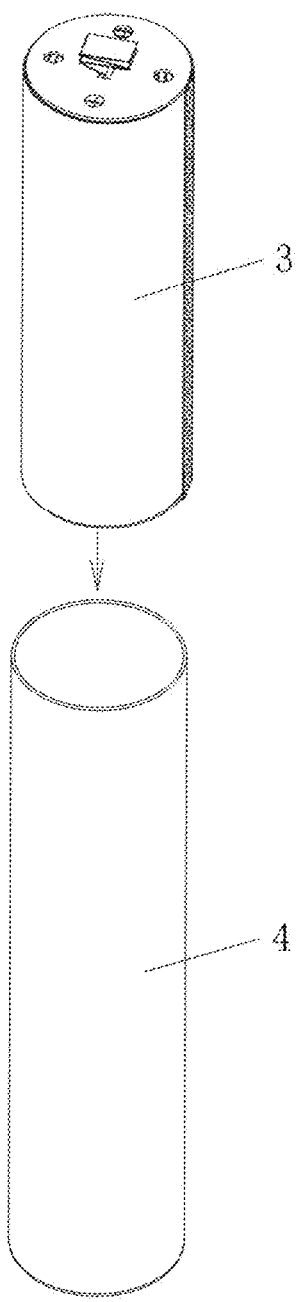
FIG. 13 is a schematic diagram of an assembly action of placing the wound battery core assembly into a metal housing in the first embodiment of the present application.
Figure 14:
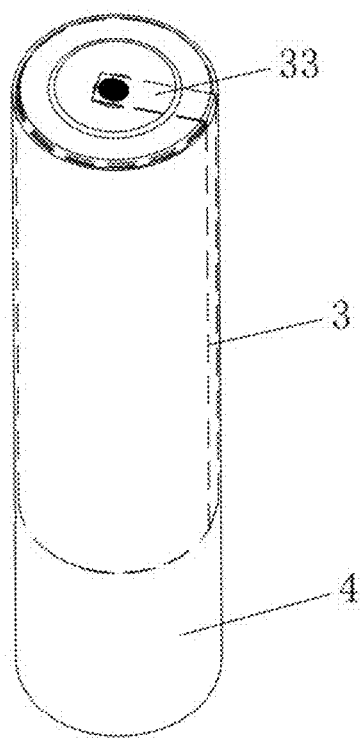
FIG. 14 is a schematic diagram of an action of welding a negative tab to the metal housing in the first embodiment of the present application.
Figure 15:
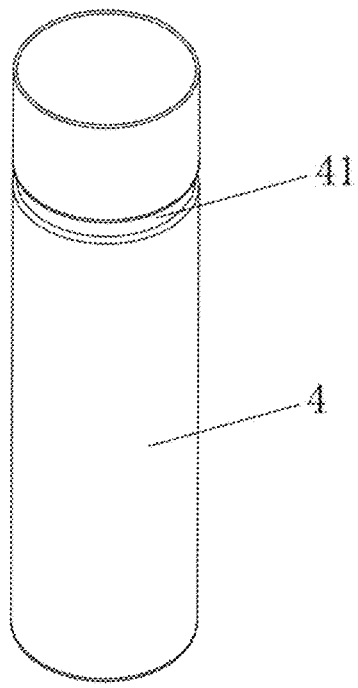
FIG. 15 is a schematic diagram of an action of manufacturing a rolling groove on the metal housing in the first embodiment of the present application.
Figure 16:
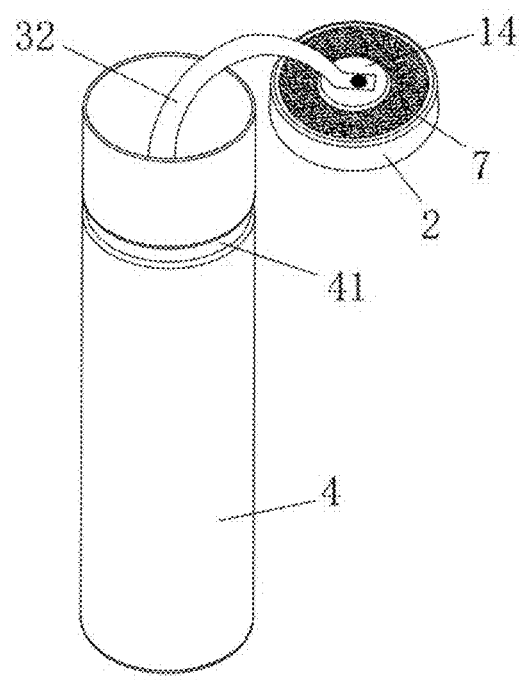
FIG. 16 is a schematic diagram of an action of welding a positive tab onto a low-voltage positive cap in the first embodiment of the present application.
Figure 17:
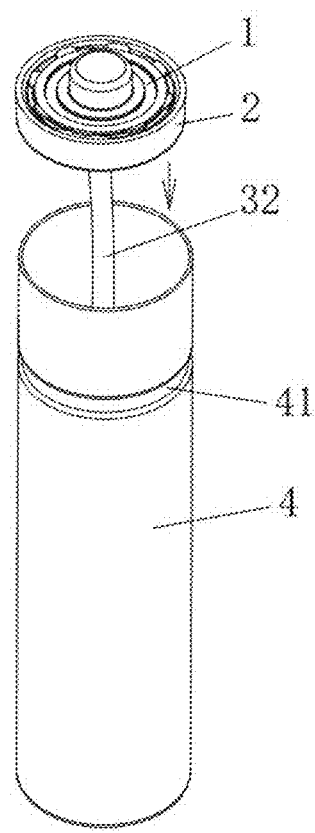
FIG. 17 is a schematic diagram of an action of placing the circuit assembly and the plastic middle frame into the metal housing in the first embodiment of the present application.
Figure 18:
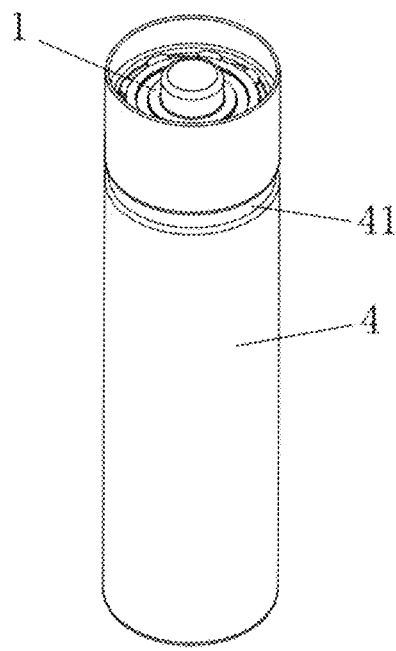
FIG. 18 is a schematic diagram of an action of manufacturing a spun edge on the metal housing in the first embodiment of the present application.
Figure 19:
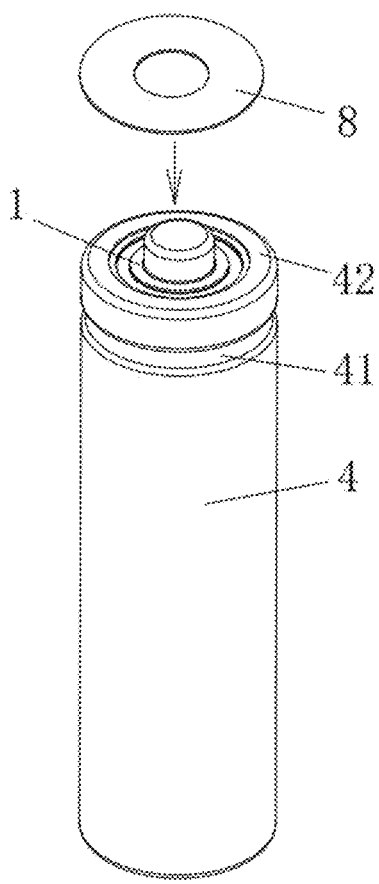
FIG. 19 is a schematic diagram of an action of pasting a positive and negative electrode isolating piece onto the spun edge in the first embodiment of the present application.
Figure 20:
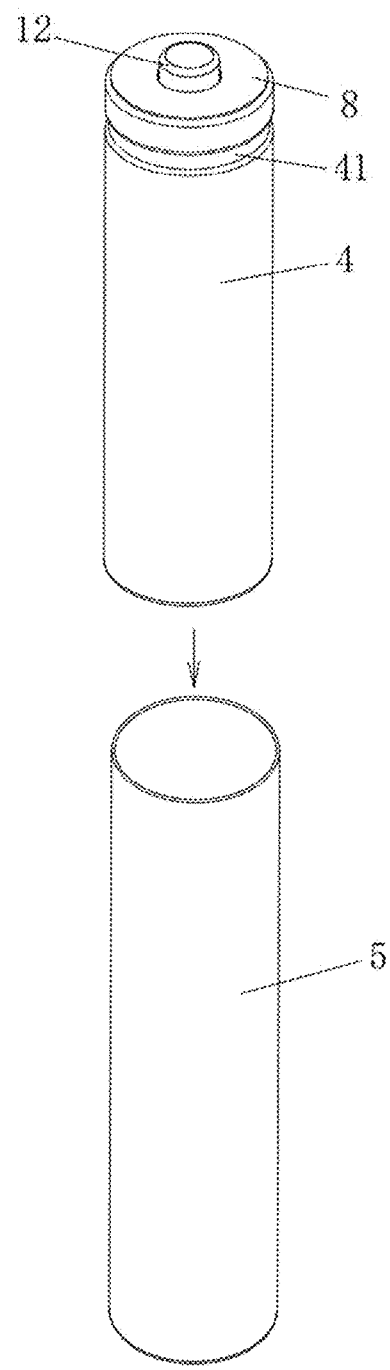
FIG. 20 is a schematic diagram of an action of placing the metal housing into an insulating sheath in the first embodiment of the present application.
Figure 21:
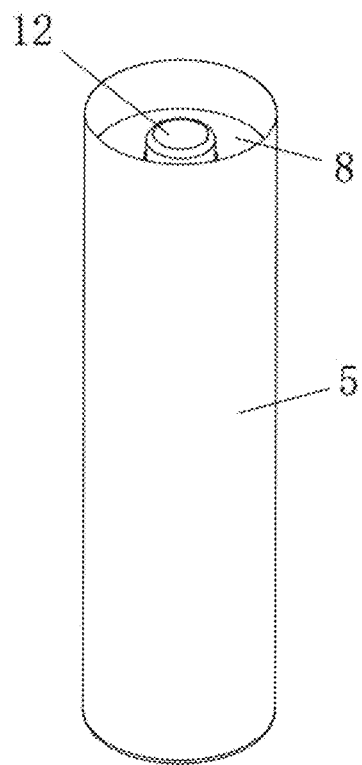
FIG. 21 is a schematic diagram of a state after the metal housing is placed into the insulating sheath in the first embodiment of the present application.
Figure 22:
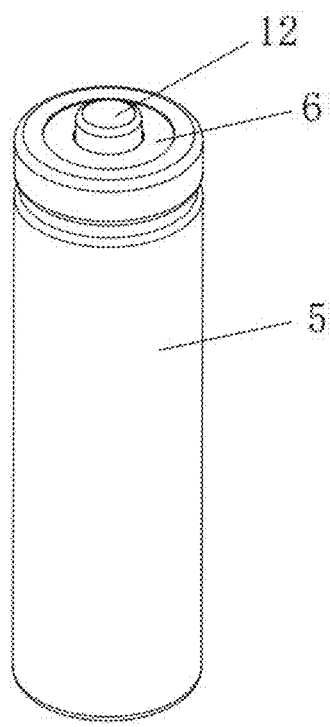
FIG. 22 is a schematic diagram of a state where the metal housing is wrapped by the insulating sheath in the first embodiment of the present application.
Figure 23:
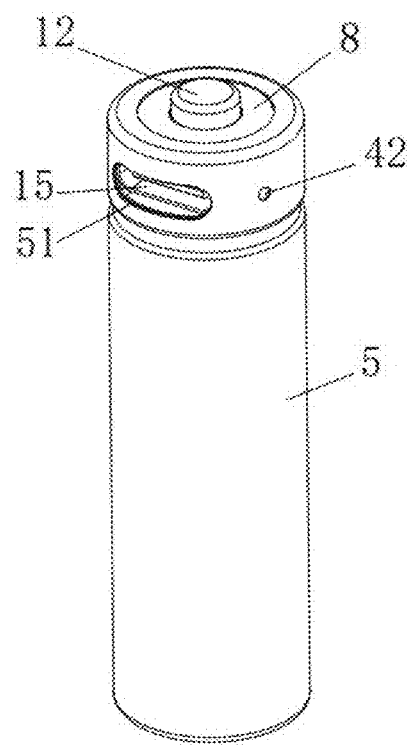
FIG. 23 is a perspective view of a 1.5V lithium battery according to a second embodiment of the present application.
Figure 24:
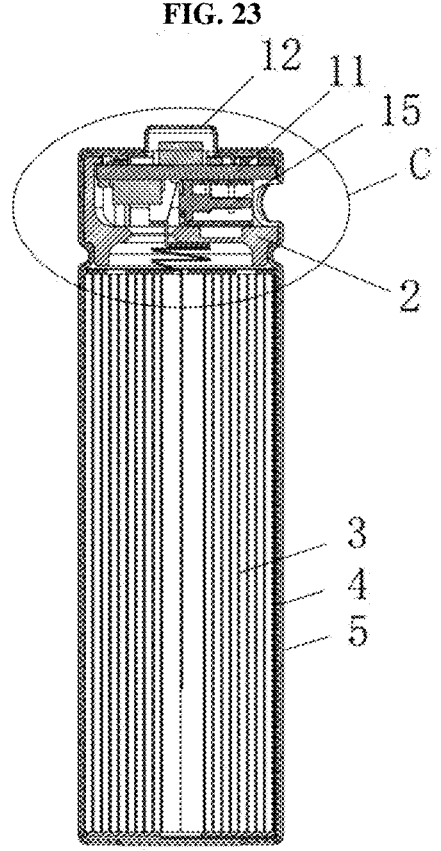
FIG. 24 is a schematic diagram of a half-section structure of the 1.5V lithium battery according to the second embodiment of the present application.

A manufacturing method of the 1.5V lithium battery according to the present embodiment includes the following steps:

referring to FIG. 8, firstly, providing the PCB 11, welding the low-voltage positive cap 12 and the negative elastic piece 13 on the front surface of the PCB 11 by the patches, and welding the high-voltage positive cap 14 on the back surface of the PCB 11 by the patch, so as to form the circuit assembly 1;

S1: referring to FIGS. 13 and 14, placing the wound battery core assembly 3 into the metal housing 4, tightly pressing the wound battery core assembly 3 at the bottom of the metal housing 4, and performing spot welding on the bottom of the metal housing 4 to weld the negative tab 33 on the metal housing 4;

S2: referring to FIG. 15, spinning forming the rolling groove 41 at the upper portion of the metal housing 4; limiting the wound battery core assembly 3 within the metal housing 4;

S3: filling the wound battery core assembly 3 with the electrolyte;

S4: placing the circuit assembly 1 into the plastic middle frame 2; dispensing the pouring sealant 7 on the back surface of the plastic middle frame 2 to form a sealing structure between the plastic middle frame 2 and the high-voltage positive cap 14;

S5: referring to FIG. 16, welding the positive tab 32 of the wound battery core assembly 3 to a lower surface of the high-voltage positive cap 14 of the circuit assembly 1;

S6: referring to FIG. 17, placing the circuit assembly 1 and the plastic middle frame 2 into the metal housing 4;

S7: referring to FIG. 18, spinning forming the spun edge 42 at the upper end of the metal housing 4, and limiting the circuit assembly 1 and the plastic middle frame 2 in the metal housing 4;

S8: referring to FIG. 19, pasting the positive and negative electrode isolating piece 8 above the spun edge 42; and S9: referring to FIGS. 20 to 22, wrapping the metal housing 4 by the insulating sheath 5.

The manufacturing method according to the present application has a reasonable process and a high yield, and can realize industrialization and large-scale production.

Second Embodiment

The second embodiment is different from the first embodiment mainly in that a charging interface 15 is added, charging is directly performed by the charging interface 15, and the charging interface 15 can be a common interface, such as miniUSB or TYPE-C in the prior art.

Referring to FIGS. 23 to 30, the circuit assembly 1 includes a PCB 11, a low-voltage positive cap 12, the charging interface 15, a negative elastic piece 13 and a positive adapter piece 16, the low-voltage positive cap 12 is welded on an upper surface of the PCB 11 by a patch, and the charging interface 15 and the positive adapter piece 16 are arranged on a lower surface of the PCB 11. The upper surface of the PCB 11 is provided with a common negative pad 115, the negative elastic piece 13 includes a substrate 133 and a plurality of fins 132 arranged at an outer edge of the substrate 133, a back surface of the substrate 133 is welded on the common negative pad 115 by a patch, the fins 132 are elastically pressed on the spun edge 42 of the metal housing 4, the positive tab 32 of the wound battery core assembly 3 is fixedly welded to the positive adapter piece 16, and the negative tab 33 is fixedly welded to a bottom end of the metal housing 4. The PCB 11 is clamped in the plastic middle frame 2, and the PCB 11 is further provided with a charging indicator lamp 17 which plays an indicating role during charging. Same positions of the insulating sheath 5 and the metal housing 4 are provided with charging holes 51, 43 and light transmission holes 52, 44, and the plastic middle frame 2 is made of a transparent material.

The fins 132 elastically abut against the spun edge 42 of the metal housing 4, which can avoid insufficient pressing fit between the metal housing 4 and the negative elastic piece 13, or crushing of the PCB 11.

Figure 25:
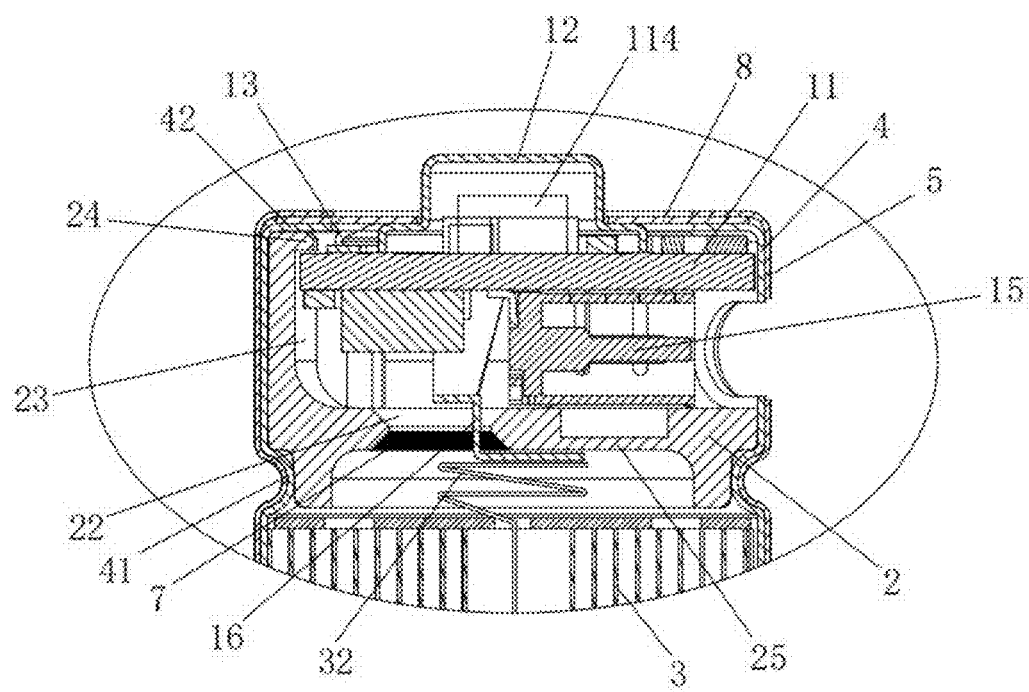
FIG. 25 is an enlarged view of Portion C in FIG. 24.
Figure 26:
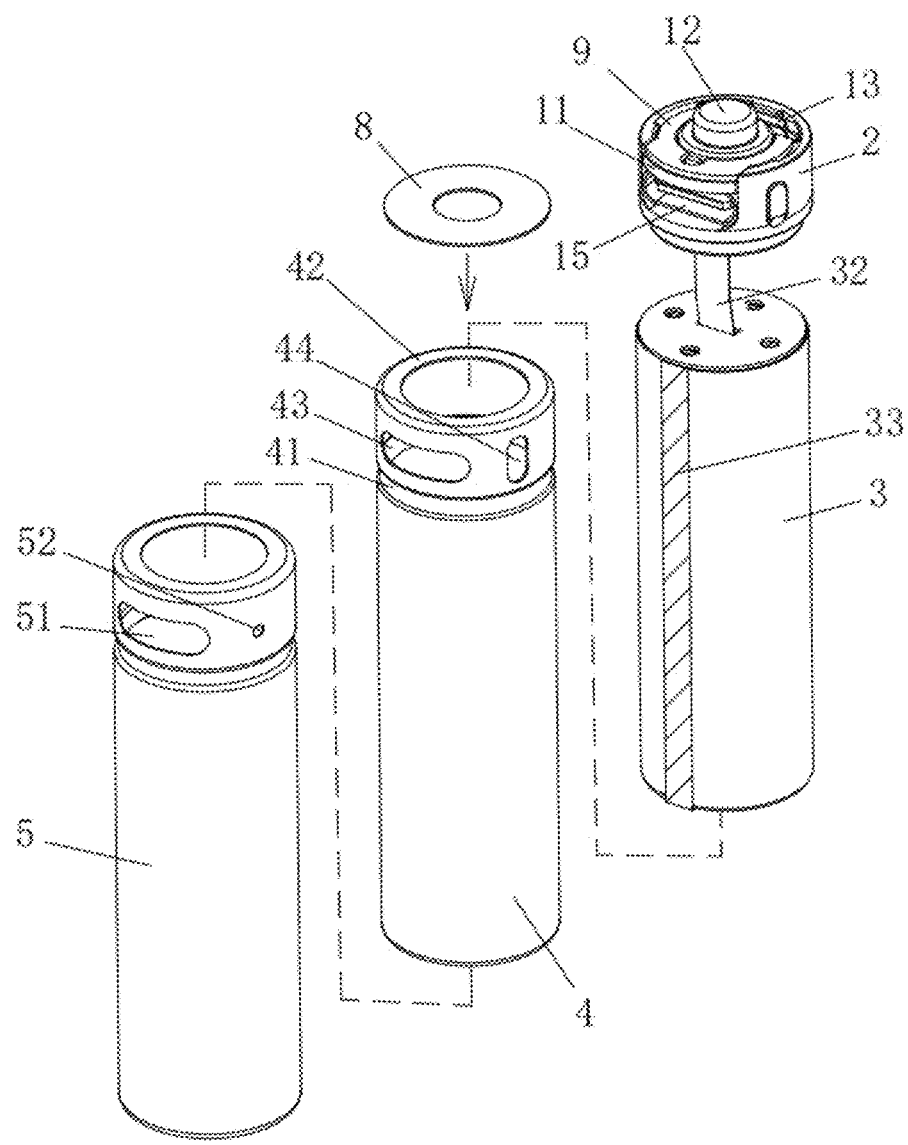
FIG. 26 is a schematic diagram of an exploded structure of the 1.5V lithium battery according to the second embodiment of the present application.
Figure 27:
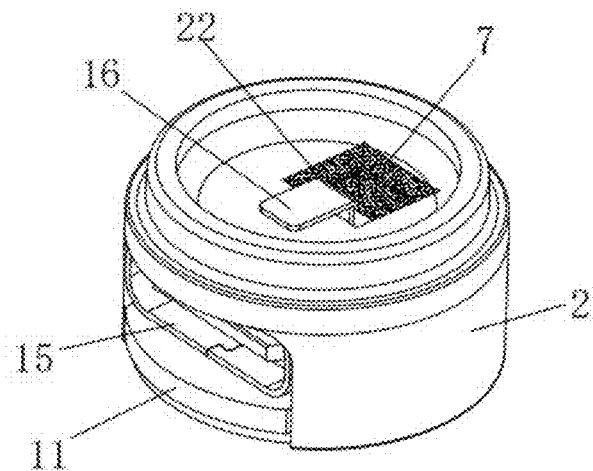
FIG. 27 is a back perspective view of an assembly of a PCB and a plastic middle frame in the second embodiment of the present application.
Figure 28:
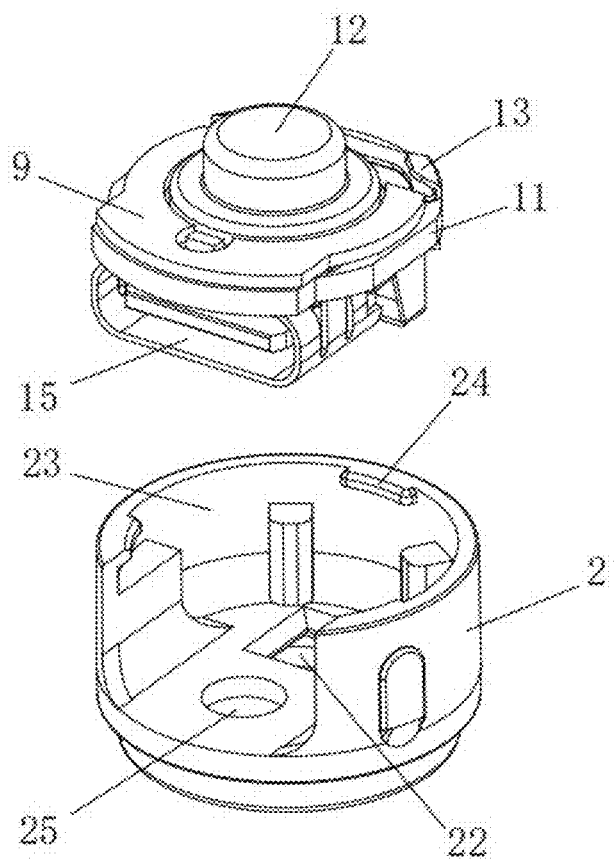
FIG. 28 is a front perspective view of an exploded structure of the PCB and the plastic middle frame in the second embodiment of the present application.
Figure 29:
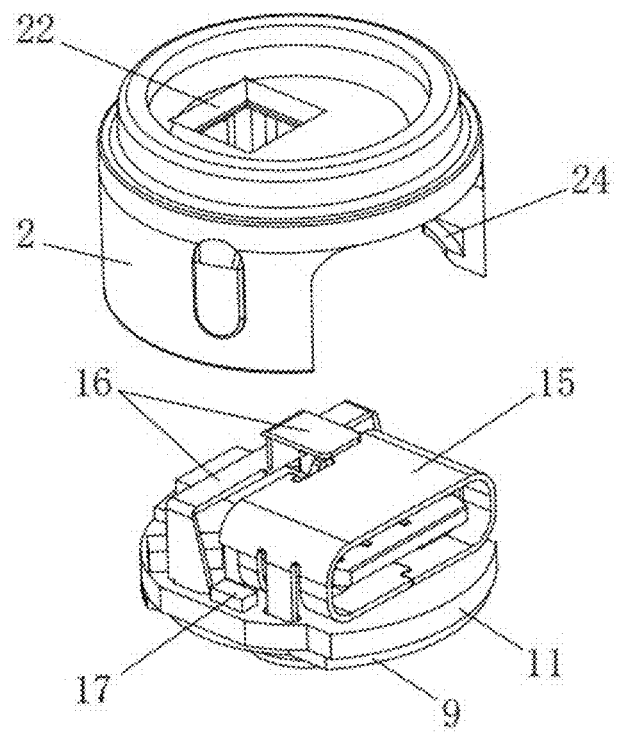
FIG. 29 is a back perspective view of the exploded structure of the PCB and the plastic middle frame in the second embodiment of the present application.

Referring to FIG. 25, a first through hole 22 is formed in a middle of a bottom wall of the plastic middle frame 2, the positive adapter piece 16 downwards penetrates through the first through hole 22 and is bent to be connected with the positive tab 32 by spot welding, and a pouring sealant 7 is arranged at the first through hole 22 to form sealing, so as to isolate the electrolyte. A positive and negative electrode isolating piece 8 is further pasted above the spun edge 42, part of an outer side of the positive and negative electrode isolating piece 8 is wrapped by the insulating sheath 5, and a PCB isolating piece 9 is further arranged between the PCB 11 and the spun edge 42 to prevent a short circuit between the electronic elements 114 or welding spots on the PCB 11 and the spun edge 42. The plastic middle frame 2 is internally provided with an accommodating cavity 23 of the PCB 11, an inner wall of an upper end of the plastic middle frame is discretely provided with a plurality of first buckles 24, the PCB 11 is limited in the accommodating cavity 23 by the first buckles 24, and since the first buckles 24 have a certain elastic deformation capability, the PCB 11 is directly pressed in the accommodating cavity 23, and the first buckles 24 can prevent the PCB 11 from outwards moving. The plastic middle frame 2 also has the effect of isolating the PCB 11 from the metal housing 4. A thin wall pressure release hole 25 is further formed in the bottom wall of the plastic middle frame 2, the thin wall pressure release hole 25 is located below the charging interface 15, and once a temperature rises and an air pressure sharply increases due to failure in the wound battery core assembly 3, a thin wall can be broken to release the pressure, the risk of a lithium battery explosion is reduced, a distance between the thin wall pressure release hole 25 and the charging holes 51, 43 is quite short, and a pressure release path is short.

Figure 30:
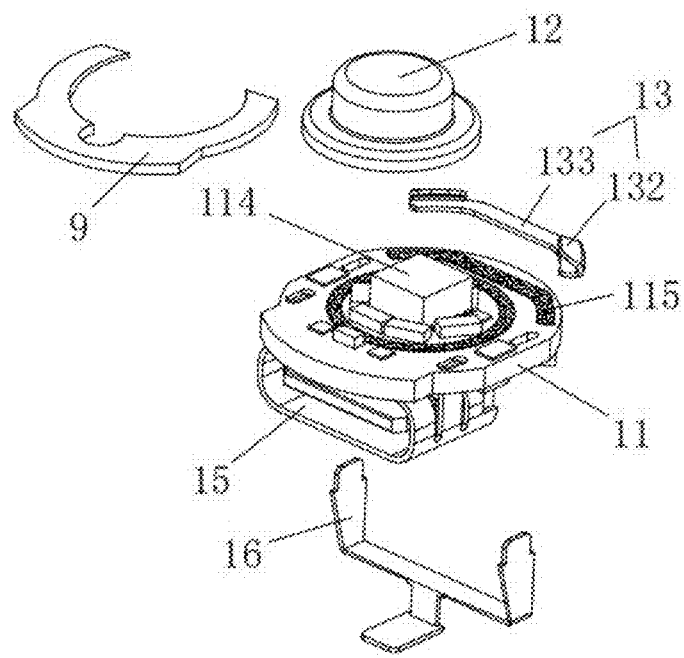
FIG. 30 is a schematic diagram of an exploded structure of the PCB in the second embodiment of the present application.
Figure 31:
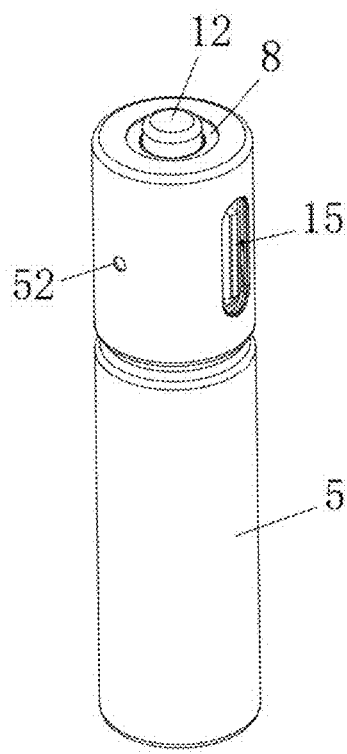
FIG. 31 is a perspective view of a 1.5V lithium battery according to a third embodiment of the present application.
Figure 32:
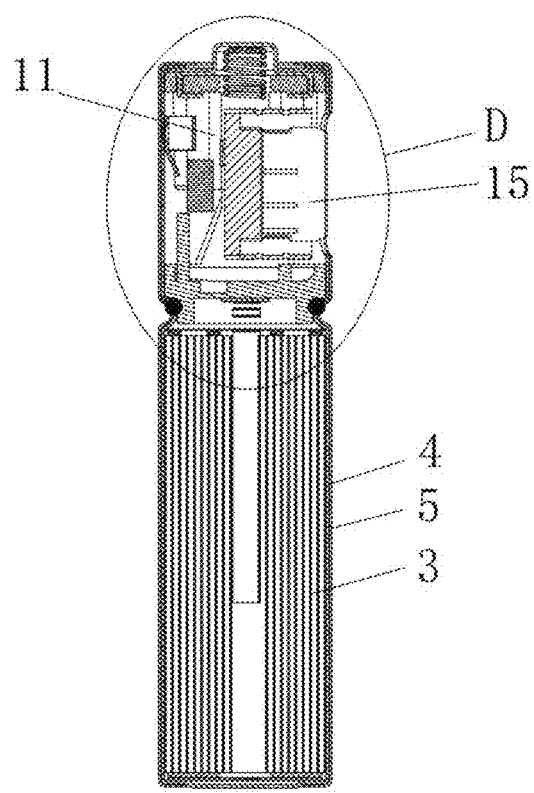
FIG. 32 is a schematic diagram of a half-section structure of the 1.5V lithium battery according to the third embodiment of the present application.
Figure 33:
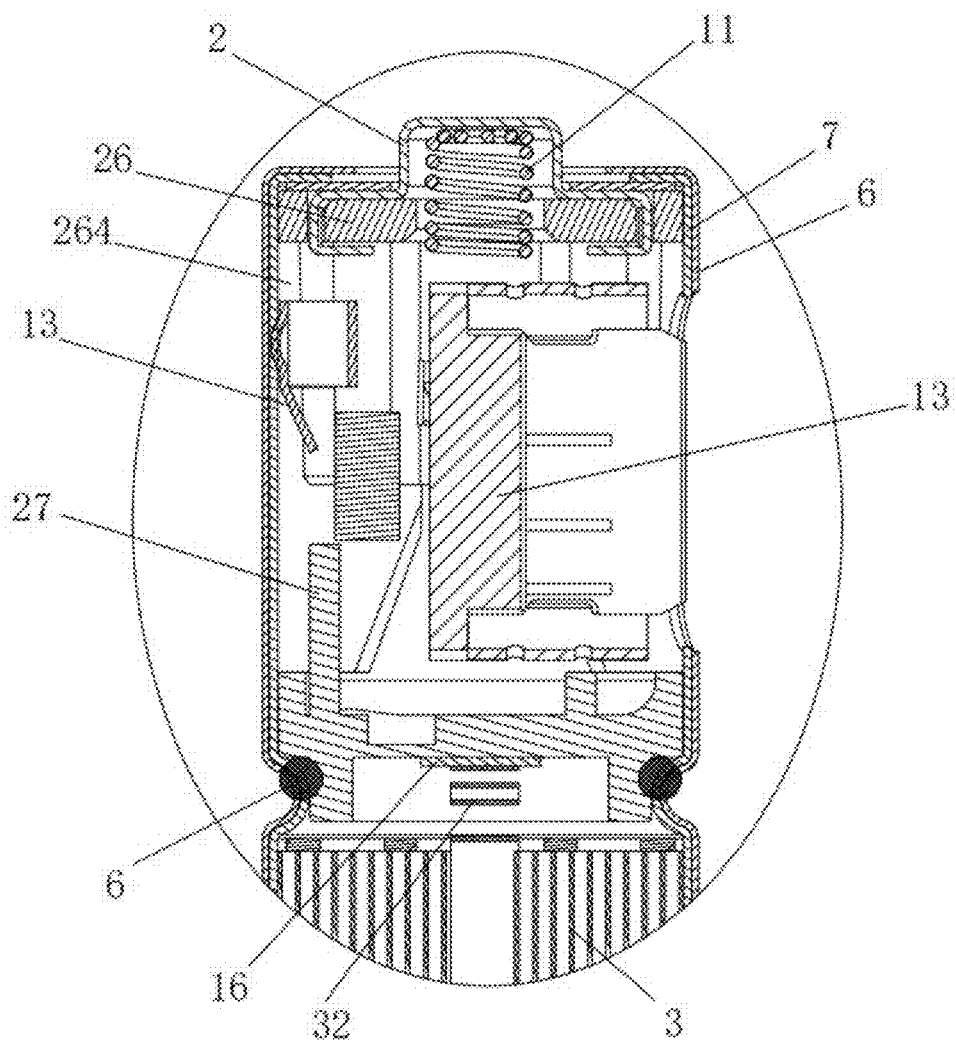
FIG. 33 is an enlarged view of Portion D in FIG. 32.
Figure 34:
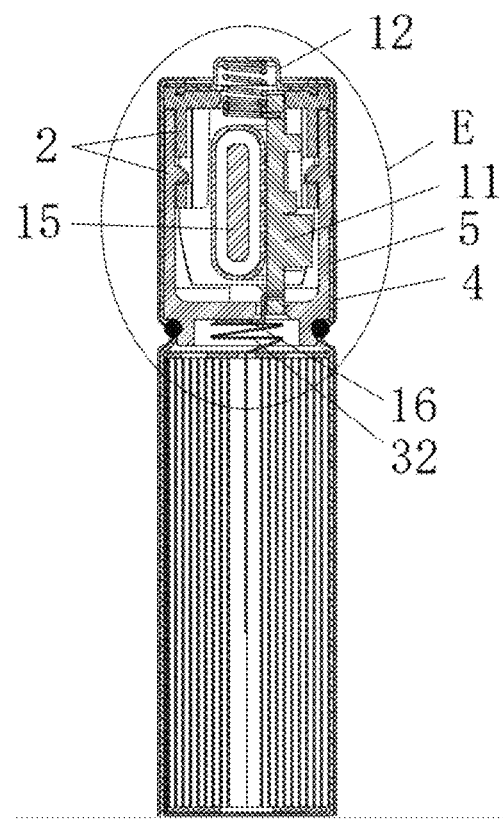
FIG. 34 is a schematic diagram of a half-section structure of the 1.5V lithium battery according to the third embodiment of the present application from another perspective.

Referring to FIG. 30, the low-voltage positive cap 12 is welded on the PCB 11 by a patch, and both fixation and electrical connection are reliable. Some electronic elements 114 on the PCB 11 are disposed in the low-voltage positive cap 12, such that an inner space of the low-voltage positive cap 12 is fully utilized, the low-voltage positive cap 12 protects the internal electronic elements 114, a sealing effect is good, and water and dust are prevented.

In the present embodiment, the PCB 11 is clamped in the plastic middle frame 2, the PCB 11 cannot be easily moved out of the plastic middle frame 2, to fix and protect the PCB 11, and prevent PCB 11 from being pressed when the spun edge 42 is processed, as well as isolate the PCB from the metal housing 4 to avoid a short circuit.

Other structures and beneficial effects are consistent with the first embodiment, and are not repeated herein.

Third Embodiment

The third embodiment is different from the second embodiment in that the circuit assembly 1 is greatly changed, especially an arrangement of the charging interface 15.

Referring to FIGS. 31 to 37, the circuit assembly 1 includes a PCB 11, a positive contact spring 18, a positive adapter piece 16, a negative elastic piece 13, and a low-voltage positive cap 12. The plastic middle frame 2 includes an upper plastic housing 26 and a plastic lower housing 27 which are buckled to each other, the PCB 11 is vertically arranged between the upper plastic housing 26 and the plastic lower housing 27, and the plastic middle frame 2 has the effect of isolating the PCB 11 from the metal housing 4. The positive contact spring 18 is arranged at an upper end of the PCB, the positive adapter piece 16 is arranged at a lower end of the PCB 11, and the charging interface 15 and the negative elastic piece 13 are arranged in a middle of the PCB 11. The low-voltage positive cap 12 is arranged on the upper plastic housing 26, the positive contact spring 18 upwardly penetrates through the upper plastic housing 26 to be in elastic contact with an inner wall of the low-voltage positive cap 12. The negative elastic piece 13 is in elastic contact with an inner wall of the metal housing 4. The positive tab 32 of the wound battery core assembly 3 is welded on the positive adapter piece 16. The positive and negative electrode isolating piece 8 is arranged between the spun edge 42 and the low-voltage positive cap 12, and mainly prevents a short circuit between the metal housing 4 and the low-voltage positive cap 12. The PCB 11 is further provided with a charging indicator lamp 17 which plays an indicating role during charging. Same positions of the insulating sheath 5 and the metal housing 4 are provided with charging holes 51, 43 and light transmission holes 52, 44, and the upper plastic housing 26 and the plastic lower housing 27 are both made of a transparent material.

Figure 37:
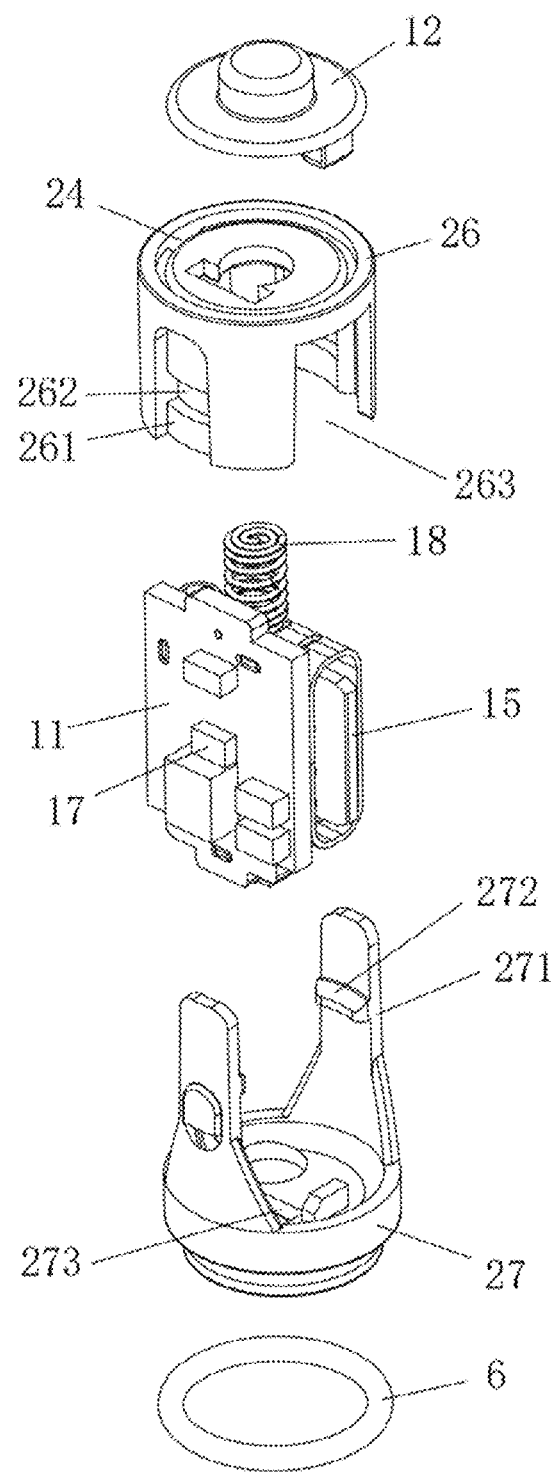
FIG. 37 is a schematic diagram of an exploded structure of a PCB and a plastic middle frame in the third embodiment of the present application.

Referring to FIG. 37, a slot 261 is formed in a side surface of the upper plastic housing 26, a buckling hole 262 is formed in a side wall of the slot 261, an inserting piece 271 is arranged on the plastic lower housing 27, and a second buckle 272 is arranged on an inner side of the inserting piece 271. After the upper plastic housing 26 docks with the plastic lower housing 27, the inserting piece 271 is inserted into the slot 261, and the second buckle 272 is embedded into the buckling hole 262, such that the upper plastic housing 26 and the plastic lower housing 27 are buckled and fixed into a whole. A side wall of the upper plastic housing 26 is further provided with a first positioning hole 263 and a second positioning hole 264 which are configured to expose the charging interface 15 and the negative elastic piece 13, respectively.

Figure 35:
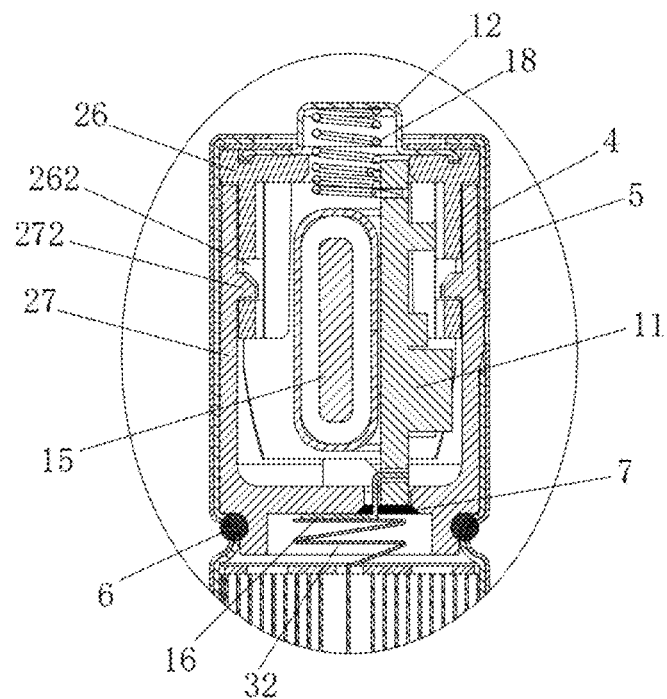
FIG. 35 is an enlarged view of Portion E in FIG. 34.
Figure 36:
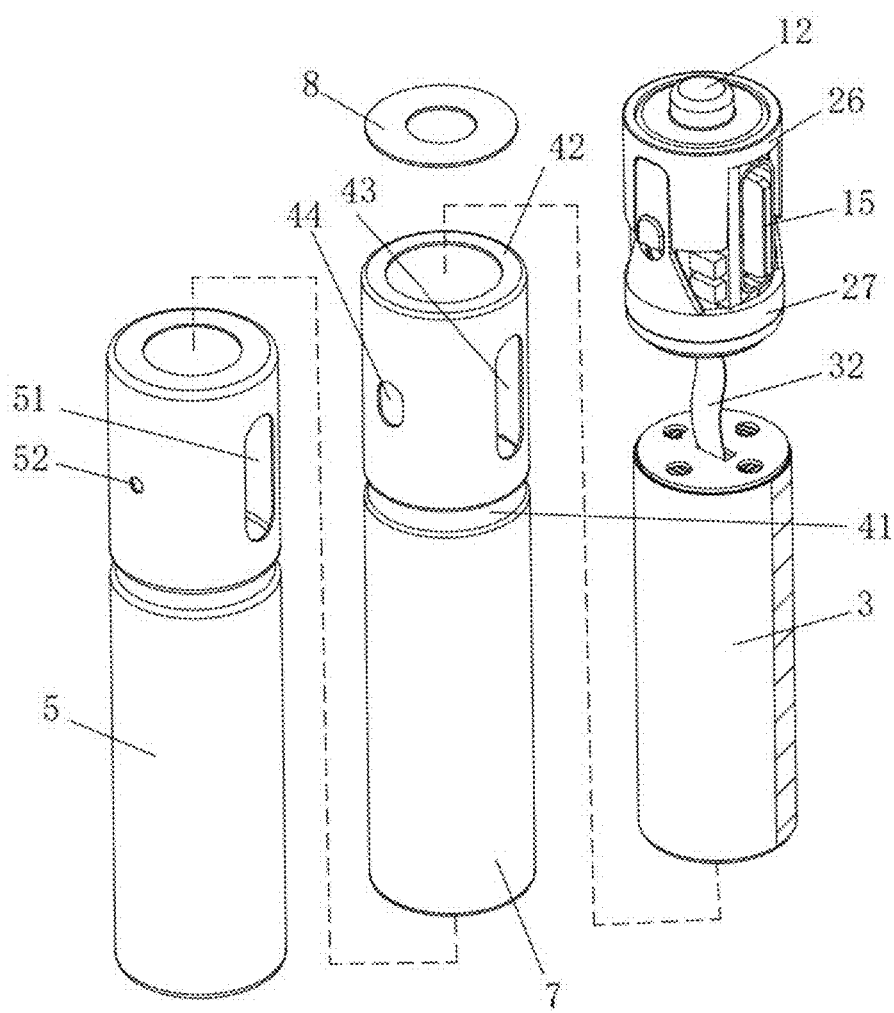
FIG. 36 is a schematic diagram of an exploded structure of the 1.5V lithium battery according to the third embodiment of the present application.

Referring to FIG. 35, a lower end of the plastic middle frame 2 is sleeved with a sealing ring 6, and the sealing ring 6 is tightly pressed between the plastic middle frame 2 and the rolling groove 41, thereby realizing the sealing between the plastic middle frame 2 and the metal housing 4. In the process of forming the spun edge 42, the plastic middle frame 2 can be downwards pressed, and the sealing ring 6 is pressed and deformed, such that a high sealing degree can be achieved to effectively present electrolyte leakage.

Referring to FIG. 35, a second through hole 273 is formed in a middle of a bottom wall of the plastic lower housing 27, and the positive adapter piece 16 downwards penetrates through the second through hole 273 and is bent to be connected with the positive tab 32 by spot welding. A pouring sealant 7 is arranged at the second through hole 273 to form sealing, so as to isolate the electrolyte and avoid that the electrolyte permeates at the second through hole 273 to contact the PCB 11, and meanwhile, a thickness of the pouring sealant 7 is controlled, and the second through hole can also be used as a pressure release hole.

In the present embodiment, the PCB 11 can be vertically arranged in the plastic middle frame 2, and the charging interface 15 on the PCB 11 is also vertically arranged, such that the charging interface 15 can be easily placed in the metal housing 4; especially when the lithium battery is an AAA battery and has a small size, the plastic middle frame 2 can protect the PCB 11 to prevent the PCB 11 from being pressed when the spun edge 42 is processed, and can also be isolated from the metal housing 4 to avoid a short circuit.

Other structures and beneficial effects are consistent with the second embodiment, and are not repeated here.

The above embodiments are preferred embodiments of the present application, and the protection scope of the present application is not limited thereby, and therefore, equivalent changes made according to the structure, shape and principle of the present application shall be covered by the protection scope of the present application.

LISTING OF REFERENCE SIGNS

1. Circuit Assembly
11. PCB
111. Low-Voltage Positive Copper Ring
112. Negative Copper Ring
113. High-Voltage Positive Copper Ring
114. Electronic Element
115. Common Negative Pad
12. Low-Voltage Positive Cap
13. Negative Elastic piece
131. Base Ring
132. Fin
133. Substrate
14. High-Voltage Positive Cap
15. Charging Interface
16. Positive Adapter piece
17. Charging indicator lamp
18. Positive Contact Spring
2. Plastic Middle Frame
21. Flange Edge
22. First Through Hole
23. Accommodating Cavity
24. First Buckle
25. Thin Wall Pressure Release Hole
26. upper plastic housing
261. Slot
262. Buckling Hole
263. First Avoidance Hole
264. Second Avoidance Hole
27. plastic lower housing
271. Inserting piece
272. Second Buckle
273. Second Through Hole
3. Wound Battery Core Assembly
31. Wound Battery Core
32. Positive Tab
33. Negative Tab
34. Upper isolating piece
35. Lower isolating piece
4. metal housing
41. rolling groove
42. Spun Edge
43. Charging Hole
44. Light Transmission Hole
5. Insulating Sheath
51. Charging Hole
52. Light Transmission Hole
6. Sealing Ring
7. Pouring Sealant
8. Positive And Negative Electrode isolating piece
9. PCB isolating piece

What is claimed is:

1. A 1.5V lithium battery, comprising a circuit assembly, a plastic middle frame, a wound battery core assembly, a metal housing and an insulating sheath, wherein:
the insulating sheath covers the metal housing,
the circuit assembly, the plastic middle frame and the wound battery core assembly are sequentially arranged in the metal housing from top to bottom, a rolling groove for fixing the wound battery core assembly is inwardly defined in an upper portion of the metal housing, a spun edge is inwardly provided at a top of the metal housing, the wound battery core assembly is limited at a bottom of the metal housing by the rolling groove, the plastic middle frame is limited between the rolling groove and the spun edge to realize a sealing between the plastic middle frame and the metal housing, the circuit assembly is arranged on the plastic middle frame, the wound battery core assembly comprises a wound battery core, a positive tab, a negative tab, an upper isolating piece and a lower isolating piece, the positive tab penetrates out of a central hole of the upper isolating piece to be electrically connected to the circuit assembly, the negative tab is wound from a side surface to a bottom surface of the wound battery core, and an end portion of the negative tab is welded to a bottom wall of the metal housing, and the circuit assembly comprises a printed circuit board (PCB), a low-voltage positive cap, a negative elastic piece and a high-voltage positive cap, a front surface of the PCB is provided with a low-voltage positive copper ring and a negative copper ring, a back surface of the PCB is provided with a high-voltage positive copper ring, the low-voltage positive cap is patch welded on the low-voltage positive copper ring, the negative elastic piece has a lower surface welded on the negative copper ring and an upper surface pressed on the spun edge of the metal housing, the high-voltage positive cap is patch welded on the high-voltage positive copper ring and used as a high-voltage positive input end, the high-voltage positive cap is connected with the positive tab in a welded mode, the low-voltage positive cap is used as a low-voltage output positive electrode of the 1.5V lithium battery, and the metal housing is used as a common negative electrode.

2. The 1.5V lithium battery according to claim 1, wherein the sealing between the plastic middle frame and the metal housing is realized by close fit.

3. The 1.5V lithium battery according to claim 1, wherein a lower end of the plastic middle frame is sleeved with a sealing ring, and the sealing ring is pressed between the plastic middle frame and the rolling groove to realize the sealing between the plastic middle frame and the metal housing.

4. A 1.5V lithium battery, comprising a circuit assembly, a plastic middle frame, a wound battery core assembly, a metal housing and an insulating sheath, wherein:

the insulating sheath covers the metal housing, the circuit assembly, the plastic middle frame and the wound battery core assembly are sequentially arranged in the metal housing from top to bottom, a rolling groove for fixing the wound battery core assembly is inwardly defined in an upper portion of the metal housing, a spun edge is inwardly provided at a top of the metal housing, the wound battery core assembly is limited at a bottom of the metal housing by the rolling groove, the plastic middle frame is limited between the rolling groove and the spun edge to realize a sealing between the plastic middle frame and the metal housing, the circuit assembly is arranged on the plastic middle frame, the wound battery core assembly comprises a wound battery core, a positive tab, a negative tab, an upper isolating piece and a lower isolating piece, the positive tab penetrates out of a central hole of the upper isolating piece to be electrically connected to the circuit assembly, the negative tab is wound from a side surface to a bottom surface of the wound battery core, and an end portion of the negative tab is welded to a bottom wall of the metal housing, and the circuit assembly comprises a printed circuit board (PCB), a low-voltage positive cap, a charging interface, a negative elastic piece and a positive adapter piece, the low-voltage positive cap is patch welded on an upper surface of the PCB, the charging interface and the positive adapter piece are arranged on a lower surface of the PCB, the upper surface of the PCB is provided with a common negative pad, the negative elastic piece comprises a substrate and a plurality of fins arranged at an outer edge of the substrate, a back surface of the substrate is patch welded on the common negative pad, the fins are elastically pressed on the spun edge of the metal housing, the positive tab of the wound battery core assembly is fixedly welded to the positive adapter piece, the negative tab is fixedly welded to a bottom end of the metal housing, the PCB is clamped in the plastic middle frame, the PCB is further provided with a charging indicator lamp, the insulating sheath and the metal housing are provided with a charging hole and a light transmission hole at the same positions, and the plastic middle frame is made of a transparent material.

5. A 1.5V lithium battery, comprising a circuit assembly, a plastic middle frame, a wound battery core assembly, a metal housing and an insulating sheath, wherein:

the insulating sheath covers the metal housing, the circuit assembly, the plastic middle frame and the wound battery core assembly are sequentially arranged in the metal housing from top to bottom, a rolling groove for fixing the wound battery core assembly is inwardly defined in an upper portion of the metal housing, a spun edge is inwardly provided at a top of the metal housing, the wound battery core assembly is limited at a bottom of the metal housing by the rolling groove, the plastic middle frame is limited between the rolling groove and the spun edge to realize a sealing between the plastic middle frame and the metal housing, the circuit assembly is arranged on the plastic middle frame, the wound battery core assembly comprises a wound battery core, a positive tab, a negative tab, an upper isolating piece and a lower isolating piece, the positive tab penetrates out of a central hole of the upper isolating piece to be electrically connected to the circuit assembly, the negative tab is wound from a side surface to a bottom surface of the wound battery core, and an end portion of the negative tab is welded to a bottom wall of the metal housing, and the circuit assembly comprises a printed circuit board (PCB), a positive contact spring, a positive adapter piece, a negative elastic piece and a low-voltage positive cap, the plastic middle frame comprises an upper plastic housing and a plastic lower housing which are buckled to each other, the PCB is vertically arranged between the upper plastic housing and the plastic lower housing, the positive contact spring is arranged at an upper end of the PCB, the positive adapter piece is arranged at a lower end of the PCB, a charging interface and the negative elastic piece are arranged in a middle of the PCB, the low-voltage positive cap is arranged on the upper plastic housing, the positive contact spring upwardly penetrates through the upper plastic housing to be in elastic contact with an inner wall of the low-voltage positive cap, the negative elastic piece is in elastic contact with an inner wall of the metal housing, the positive tab of the wound battery core assembly is welded on the positive adapter piece, a positive and negative electrode isolating piece is further arranged between the spun edge and the low-voltage positive cap, a charging indicator lamp is further arranged on the PCB, the insulating sheath and the metal housing are provided with a charging hole and a light transmission hole at the same positions, and the upper plastic housing and the plastic lower housing are both made of a transparent material.

* * * * *